US006690326B2

(12) United States Patent
Nemit et al.

(10) Patent No.: US 6,690,326 B2
(45) Date of Patent: Feb. 10, 2004

(54) WIDE BANDWIDTH PHASED ARRAY ANTENNA SYSTEM

(75) Inventors: Jeffery T. Nemit, Camarillo, CA (US); Gregory G. Charlton, Reseda, CA (US); Charles E. Quintero, Moorpark, CA (US); Wendell D. Bradshaw, Fredericksburg, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/104,195

(22) Filed: Mar. 21, 2002

(65) Prior Publication Data

US 2003/0179139 A1 Sep. 25, 2003

(51) Int. Cl.[7] .................................................. G01S 3/28
(52) U.S. Cl. ....................................... 342/383; 342/372
(58) Field of Search .......................... 342/81, 368, 372, 342/373, 378, 383

(56) References Cited

U.S. PATENT DOCUMENTS 3,964,065 A * 6/1976 Roberts et al. ....... 343/100 LE
5,283,587 A * 2/1994 Hirshfield et al. .......... 342/372
5,389,939 A * 2/1995 Tang et al. ................. 343/754
5,532,706 A * 7/1996 Reinhardt et al. .......... 343/778
5,592,480 A 1/1997 Carney et al.
5,861,845 A 1/1999 Lee et al.
5,875,396 A 2/1999 Stockton
5,999,573 A 12/1999 Zangi
6,034,633 A 3/2000 Cassen
6,226,531 B1 5/2001 Holt

OTHER PUBLICATIONS

Antenna Engineering Handbook by R.C. Johnson , Chapter 20 “Phased Array”.

Radar Handbook by M.I. Skolnick, Section 7.7 “Bandwidth of Phased Array”.

* cited by examiner

*Primary Examiner*—Dao Phan
(74) *Attorney, Agent, or Firm*—Freilich, Hornbaker & Rosen

(57) ABSTRACT

A phased array antenna system in accordance with the present invention is configured to transfer signal energy between an antenna array and a source/target via multiple subbeams respectively carried in different frequency channels. Each antenna array element can thus receive a composite signal which can be band pass filtered to separate the different frequency channel signal components. By separating the signal components, a different phase taper can be applied to each signal component thereby enabling coherent signal energy to be derived from each antenna element. The derived signal energy can then be combined to produce an antenna input/output signal.

12 Claims, 4 Drawing Sheets

WIDE BANDWIDTH PHASED ARRAY ANTENNA SYSTEM

FIELD OF THE INVENTION

This invention relates generally to phased array antennas and more particularly to a method and apparatus for enhancing the instantaneous bandwidth of a phased array antenna system.

BACKGROUND OF THE INVENTION

A phased array antenna is comprised of a plurality of fixed elements which can be electronically controlled to steer a radiated beam, or receive an incident beam, at a desired angle θ relative to the antenna boresight. The steering angle θ can be controlled by adjusting the relative phase shift of the excitation signal at each of the elements defining the antenna aperture. The set of phase shift coefficients required by the plurality of antenna elements to achieve a certain steering angle θ is frequently referred to as the "phase taper" for that angle (e.g., See *Antenna Engineering Handbook* by R. C. Johnson, Chapter 20 "Phased Arrays").

A typical phased array antenna can transmit and/or receive. The transmit and receive operations are generally reciprocal, i.e., identical except for opposite directions of radiation. For clarity of explanation, most of the discussion hereinafter will focus on the receive mode of operation, but it should be understood that the discussion is generally equally relevant to the transmit mode.

Beam steering is typically accomplished by appropriately phase shifting respective excitation signals at the plurality of antenna elements. More particularly, a received beam incident on the antenna at an angle θ produces excitation signals at the plurality of elements, which, when properly phase shifted in accordance with a phase taper appropriate to the angle θ, can be added coherently to produce an antenna input/output signal. Unfortunately, the phase taper required to steer to a specific angle is dependent on the frequency of the beam signal. As a consequence, the signal bandwidth for any fixed taper, i.e., "instantaneous bandwidth", is limited (e.g., See *Radar Handbook* by M. I. Skolnick, Section 7.7 "Bandwidth of Phased Arrays").

It is well recognized that "instantaneous bandwidth" varies inversely to the size of the array and the magnitude of the steering angle from boresight. That is, the larger the array and/or the larger the steering angle, the lower the instantaneous bandwidth. Therefore, large phased arrays are generally considered unsuitable for very high bandwidth applications; e.g., extremely high data rate communications and extremely fine range resolution radar.

Recent research has examined the use of true time delay, rather than phase shifting, to steer an antenna beam. The time delays required to steer a beam to a specified angle do not vary as a function of signal frequency and therefore a true time delay steered array, in theory, has infinite bandwidth. Unfortunately, true time delay is very difficult and costly to implement. A typical true time delay embodiment would require switched lines behind each array element which cannot, in some applications, be readily accommodated. Moreover, differences in line length across the antenna aperture are likely to produce differential attenuation which can significantly distort radiation pattern side lobes. Although such distortion can be minimized by incorporating variable gain amplifiers in each switched line, such a solution further increases cost and complexity.

SUMMARY OF THE INVENTION

The present invention is directed to a phased array antenna system, and method of operation, designed to exhibit a wider instantaneous bandwidth than known phased array systems.

A phased array antenna system in accordance with the present invention is configured to transfer signal energy between an antenna array and a source/target via multiple concurrent beams respectively centered in different frequency channels, i.e., different slices of the frequency spectrum. Each of the plurality of antenna elements will thus receive a composite signal which can then be band pass filtered to separate the different frequency signal components. By separating the signal components, a different phase taper can be applied to each signal component thereby enabling coherent signal energy to be derived from the plurality of elements. The derived signal energy can then be combined for the multiple beams to produce the antenna input/output signal.

The use of multiple beams to concurrently carry a common information signal provides a low cost, high performance technique of achieving a wider bandwidth phased array antenna system. The wider bandwidth enables such a system to transmit and receive high frequency components of pulsed signals which heretofore could not be comparably handled. Thus, embodiments of the invention are suitable for use in very high band width applications.

DETAILED DESCRIPTION

Figure 1:
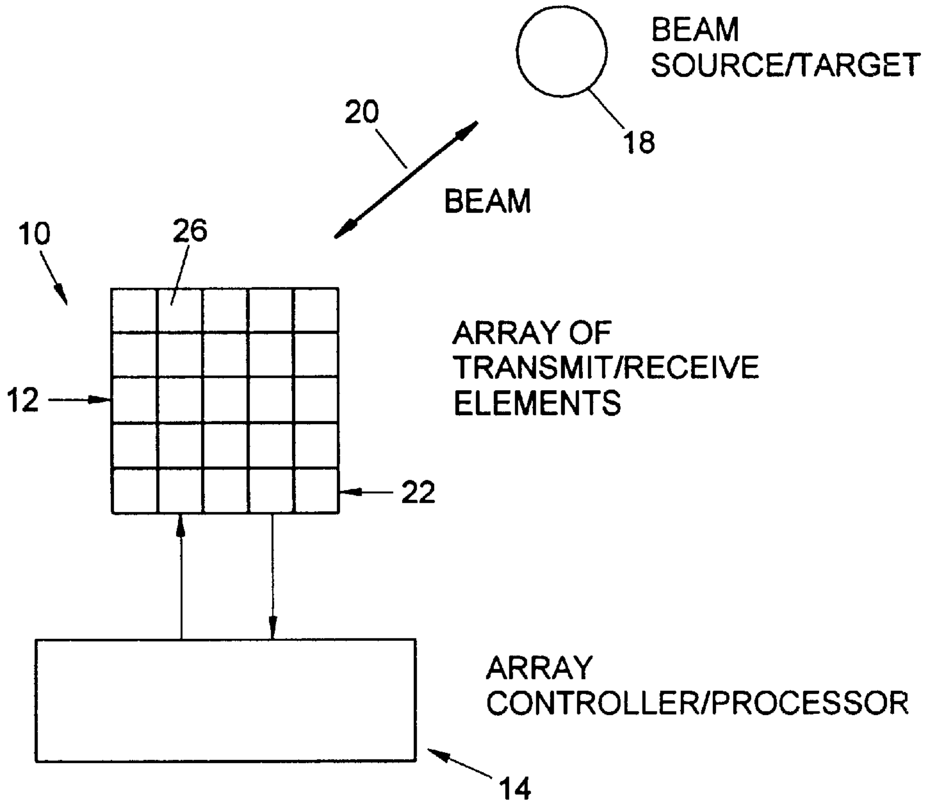
Fig. 1 Prior Art
FIG. 1 is a schematic block diagram generally representing a communication system employing a phased array antenna.

Attention is initially directed to FIG. 1 which depicts a typical phased array antenna system 10 comprised of an antenna array of transmit/receive elements 12 and a controller/processor 14. The controller/processor 14 functions to steer the array process signals provided by the array elements to produce an antenna input/output signal. The system 10 is typically used for communication with a remote source/target 18 via a signal energy beam 20.

Figure 2:
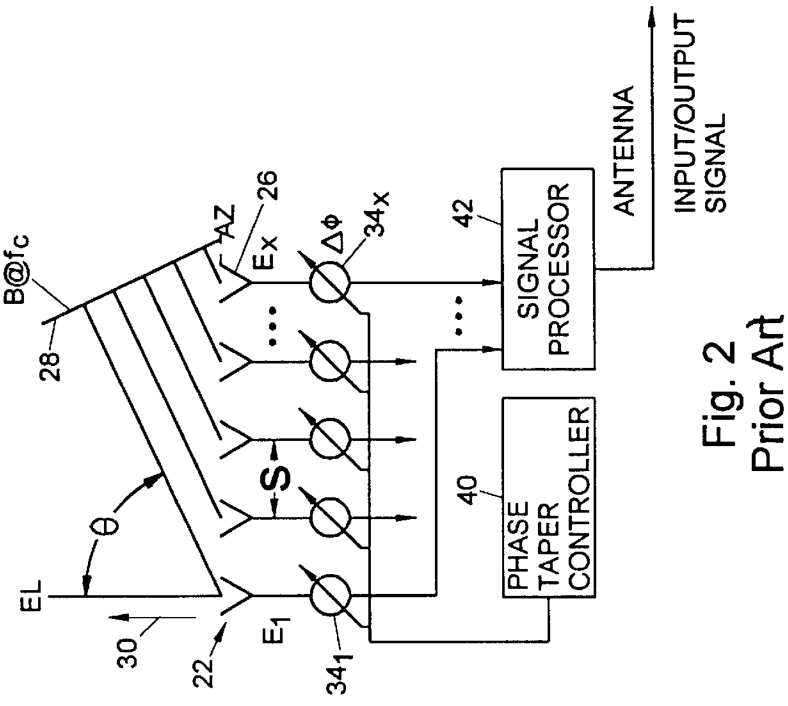
Fig. 2 Prior Art
FIG. 2 is a schematic diagram of a typical phased array antenna and support electronics.

The array 12 is typically comprised of a plurality of transmit/receive elements arranged in a two dimensional matrix which can be conveniently viewed as consisting of several interconnected linear arrays 22. One such linear array comprised of elements $E_1$, $E_2$, . . . $E_x$ is depicted in FIG. 2. More particularly, FIG. 2 shows a plurality of antenna elements 26 configured in a linear array 22 and uniformly spaced from one another by a distance S. As previously noted, although the array 12 can reciprocally operate in transmit and receive modes, for simplicity in explanation, the text herein will assume the receive mode unless otherwise stated.

FIG. 2 depicts a typical signal energy beam B, represented by wave front 28, which is incident on the linear array 22 at a steering angle θ from the antenna boresight 30. The beam 28 has a characteristic carrier frequency $f_c$ and for purposes herein will sometimes be termed as "B @ $f_c$."

As suggested by FIG. 2, the beam 28 incident on the linear array 20 arrives at the respective elements 26 at different points in time. That is, each element 26 "sees" the beam after a certain time delay relative to a neighboring element where the magnitude of the delay is related to the angle θ. In order to derive a coherent antenna input/output signal, it is necessary to time delay and/or phase shift the excitation signals generated at the respective array elements 26 to compensate for the differential time delay. Thus, FIG. 2 shows variable phase shifters $\mathbf{34}_1$ . . . $\mathbf{34}_x$ respectively connected to the elements $E_1$ . . . $E_x$. The phase shifters 34 in FIG. 2 are depicted as being controlled by a phase taper controller 40 which defines the phase taper appropriate for a desired steering angle. The phase taper refers to the set of phase shift coefficients required by the elements $E_1$ . . . $E_x$ to enable the element signals to be added coherently by the processor 42 for a particular steering angle. The phase taper at the desired steering angle θ is represented by the following expression:

$$\Delta\phi = \frac{2\pi s}{\lambda} \times \sin(\theta)$$

For fixed Δϕ:

$fc \times \sin(\theta) = \text{const.}$

From the foregoing it can be noted that the phase taper required to steer to a specified angle θ varies as a function of the beam frequency $f_c$. Thus, the signal bandwidth that can be received for a fixed phased taper, i.e., the "instantaneous bandwidth", is limited. More particularly, the instantaneous bandwidth varies inversely relative to the steering angle and the array size. In other words, the larger the array and/or the larger the steering angle, the narrower the instantaneous bandwidth.

Figure 3:
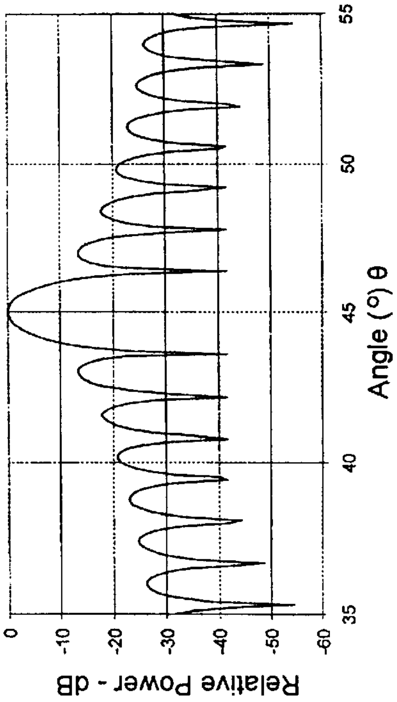
FIG. 3 is an exemplary plot showing relative signal power as a function of steering angle.
Figure 4:
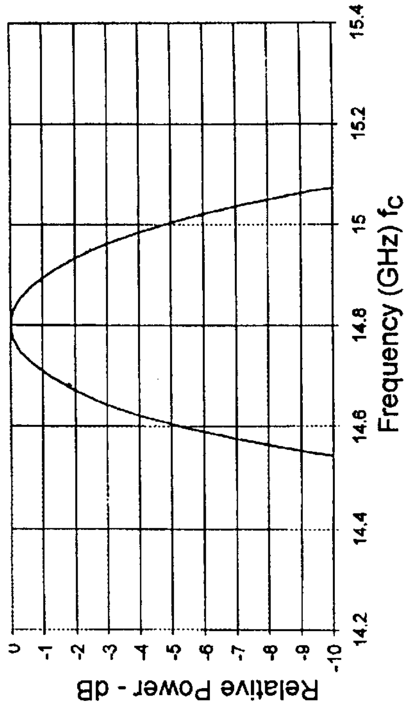
FIG. 4 is an exemplary plot showing relative signal power as a function of beam signal frequency.

The narrow bandwidth of the system 10 depicted in FIG. 2 is demonstrated by FIGS. 3 and 4. That is, FIG. 3 shows the relative receive signal power derived from a phased array for a beam steered at an angle of 45°. FIG. 4 shows the relative receive signal power as a function of the beam frequency, represented here as 14.8 gigahertz. Note in both FIGS. 3 and 4, the rapid falloff of received power as the beam deviates from the angle θ and from its center frequency $f_c$.

Figure 5:
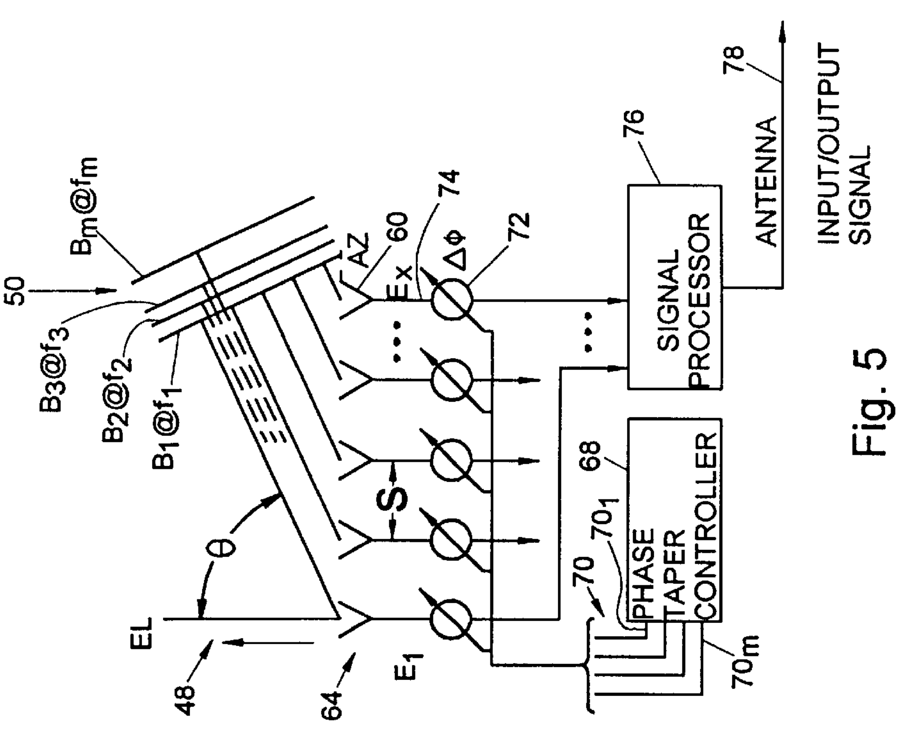
FIG. 5 is a schematic representation of a multiple beam transmission in accordance with the present invention.
Figure 8:
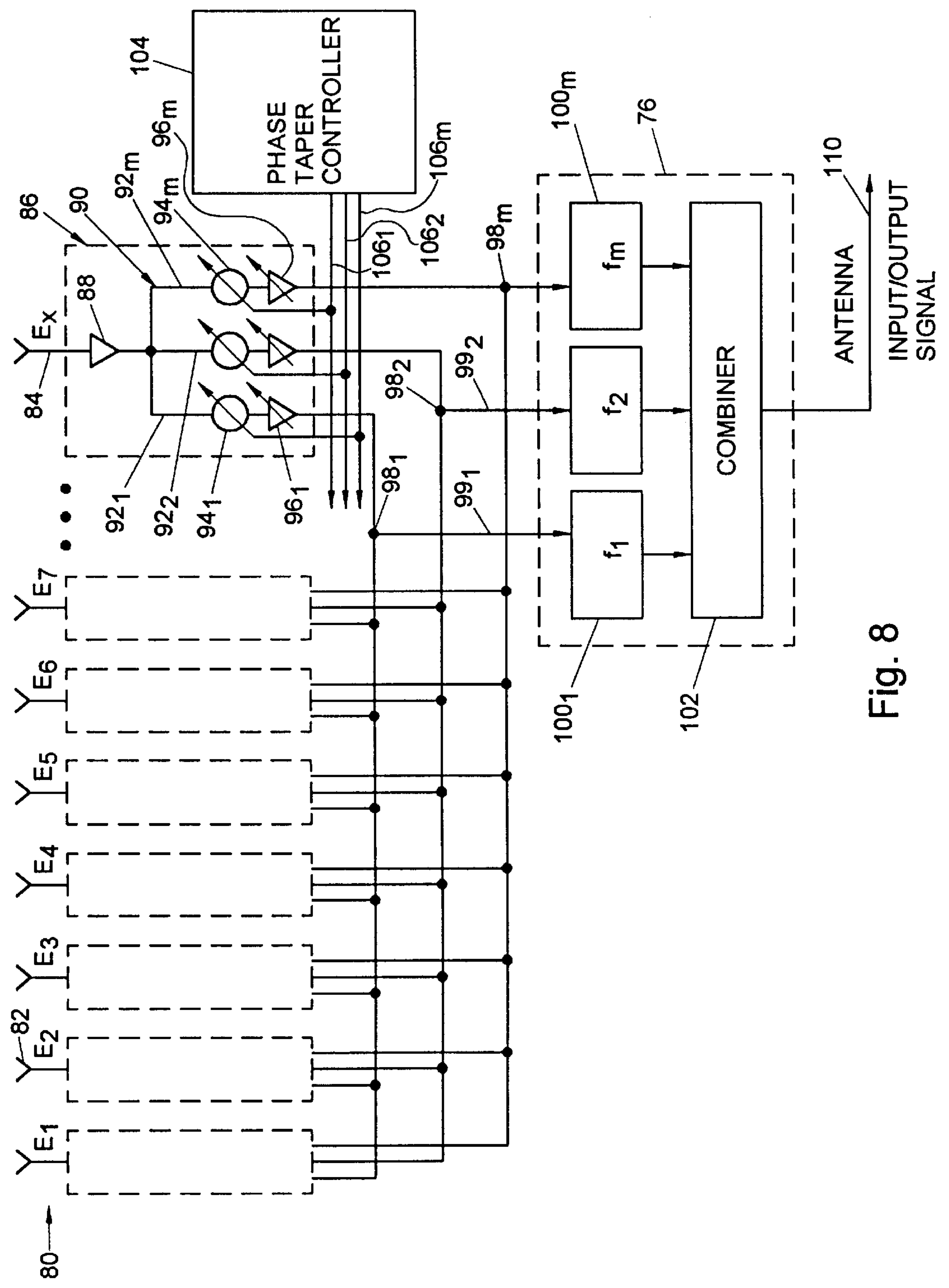
FIG. 8 is a block diagram depicting a preferred embodiment of the present invention.

In order to achieve a wider bandwidth, a system 48 in accordance with the invention, as represented in FIG. 5, employs multiple beams respectively carried in different frequency channels, rather than a single beam as depicted in FIG. 2. That is, rather than using the single beam B @ $f_c$ to carry an information signal, the information signal is carried by concurrent multiple (m) subbeams 50 respectively represented as $B_1$ @ $f_1$, $B_2$ @ $f_2$, $B_3$ @ $f_3$ . . . $B_m$ @ $f_m$. These subbeams 50 concurrently emanate from a common source and are incident on the elements 60 of the linear array 64 at the same steering angle θ. In order to efficiently steer the antenna aperture to the desired angle θ, the phase taper controller 68 generates multiple phase tapers (represented at 70) which respectively appropriately phase shift (via shifters 72) the multiple frequency components of the element signals 74 to enable them to be added coherently by processor 76 to produce a composite antenna output signal 78. More particularly, controller 68 provides phase tapers $\mathbf{70}_1$, $\mathbf{70}_2$, $\mathbf{70}_3$, $\mathbf{70}_m$, respectively relating to the multiple subbeams. Each phase taper defines a plurality of phase shift coefficients which are used by the respective plurality of phase shifters 72 to enable the processor 76 to coherently sum the plurality of element signals, as is explained in greater detail in connection with FIG. 8. Further, in accordance with the invention, the processor 76 combines the coherent signals derived with respect to each of the multiple subbeams to produce the composite antenna signal 78. FIG. 8 to be discussed hereinafter depicts a preferred embodiment of processor 76.

Figure 6:
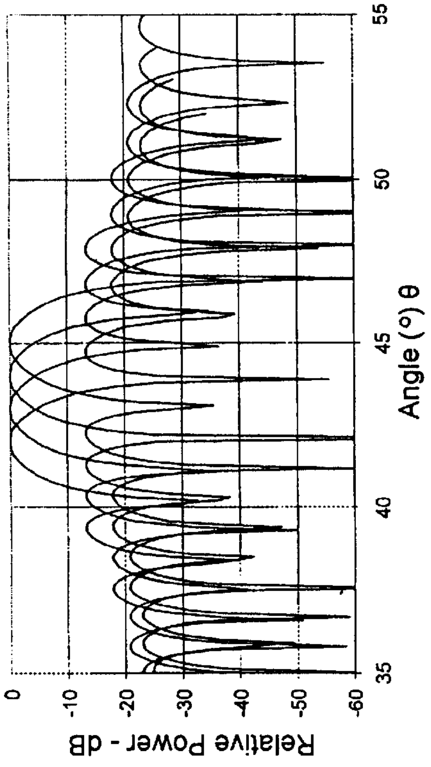
FIG. 6 is a plot showing relative signal power for the multiple beam system of FIG. 5 as a function of steering angle.
Figure 7:
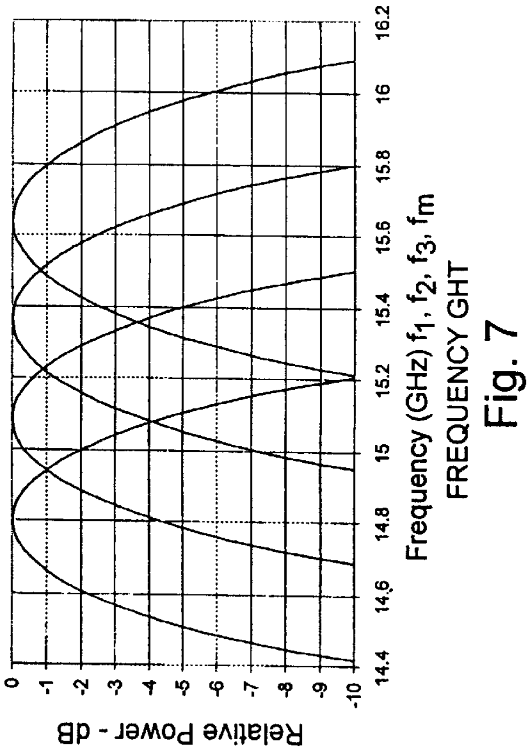
FIG. 7 is a plot showing relative signal power as a function of beam signal frequency for the multiple beam system of FIG. 5.

FIG. 6 and 7 depict performance plots for an exemplary system in accordance with the invention using m (where m=4) subbeams respectively centered at 14.8, 15.1, 15.4, and 15.7 gigahertz. FIG. 6 depicts relative receive power as a function of steering angle and demonstrates how the use of multiple concurrent subbeams enlarges the antenna aperture. FIG. 7 depicts relative receive power as a function of frequency and demonstrates the widened bandwidth attributable to the use of multiple subbeams.

Attention is now directed to FIG. 8 which comprises a block diagram of a preferred embodiment of the phased array antenna system 48 of FIG. 5. FIG. 8 depicts a linear array 80 of antenna elements 82 respectively identified as $E_1$, $E_2$, $E_3$, . . . $E_x$. Each element 82 has an input/output terminal 84 which is coupled to a phase shifter module 86. Each module 86 preferably includes a low noise amplifier 88 which in turn is coupled to multiple branches 90 respectively corresponding to the number of multiple subbeams, i.e., frequency channels, employed in the system. Thus, in the exemplary preferred embodiment depicted in FIG. 8, module 86 coupled to terminal 84 of element $E_x$ includes circuit branches $\mathbf{92}_1$, $\mathbf{92}_2$, . . . $\mathbf{92}_m$. Each branch 92 preferably includes a variable phase shifter 94 and a variable gain amplifier 96.

The plurality of modules 86 respectively connected to the element terminals 84 are substantially identical. Thus, each module 86 includes multiple circuit branches corresponding to the multiple (m) subbeam frequency channels. In the preferred embodiment depicted in FIG. 8, the outputs of all of the channel 1 variable gain amplifiers $\mathbf{96}_1$ are summed at common junction point $\mathbf{98}_1$ to produce a coherent channel 1 output signal $\mathbf{99}_1$. Similarly, the outputs of all of the channel 2 variable gain amplifiers of the modules 86 are connected in common at junction $\mathbf{98}_2$ to produce a coherent channel 2 output signal $\mathbf{99}_2$ and the outputs of the channel m variable gain amplifiers are similarly connected in common at junction $\mathbf{98}_m$ to produce a coherent channel m output signal. The respective junctions $\mathbf{98}_1$, $\mathbf{98}_2$, and $\mathbf{98}_m$ are connected to the inputs of signal processor 76 comprised of multiple band pass filters $\mathbf{100}_1$, $\mathbf{100}_2$, . . . $\mathbf{100}_m$, respectively centered at frequencies $f_1$, $f_2$, . . . $f_m$ corresponding to the frequencies of the multiple subbeams. The outputs of the multiple band pass filters $\mathbf{100}_1$, $\mathbf{100}_2$, $\mathbf{100}_m$ are coupled to a combiner circuit 102.

The multiple phase shifters 92 in each module 86 are controlled in accordance with different phase tapers defined by phase taper controller 104. Thus, controller output terminal $\mathbf{106}_1$ controls the phase shift of shifters $\mathbf{94}_1$ for all the elements $E_1$ . . . $E_x$. Similarly, phase taper output terminal $\mathbf{106}_2$ controls the phase shift for all the shifters $\mathbf{94}_2$for all the elements $E_1$ . . . $E_x$. Accordingly, the element signals respectively provided at junctions $\mathbf{98}_1$, $\mathbf{98}_2$, . . . $\mathbf{98}_m$, will be shifted by various amounts depending upon their respective phase tapers. These signals are then respectively applied to the band pass filters 100 which pass only the frequency components of interest. Thus, filter $\mathbf{100}_1$ only passes that portion of its applied signal within the band centered on $f_1$. The signal applied to filter $\mathbf{100}_1$ is derived from junction $\mathbf{98}_1$ and has been phase shifted in accordance with phase taper 1 as defined by controller 104 on output terminal 106$_1$. Similarly band pass filters 100$_2$ and 100$_m$ have signals applied thereto respectively centered on frequencies $f_2$ and $f_m$.

The component outputs produced by the multiple band pass filters 100$_1$, 100$_2$, 100$_m$ are then applied to combiner circuit 102 which sums the component signals to produce a composite antenna output signal 110.

It is further pointed out that each circuit branch 92 of modules 86 preferably contains a variable gain amplifier 96 which can be manually adjusted or controlled by controller 104. Proper adjustment of the variable gain amplifiers 96 allows the respective branches to be compensated for amplitude variations thereby eliminating a potential error source.

From the foregoing, it should now be appreciated that a phased array antenna system has been described herein utilizing multiple concurrent beams of different frequency to achieve a wider system bandwidth characteristic. Although the invention has been described with reference to specific preferred embodiments, it is recognized that various alternative implementations and modifications will readily occur to those skilled in the art which fall within the spirit of the invention and the intended scope of the appended claims. For example only, FIG. 8 depicts an embodiment in which the signal received by each antenna element is passed through multiple parallel phase shift paths prior to band pass filtering. Alternatively, the received signal could first be band pass filtered to separate the multiple signal components and then appropriately phase shifted. In either case the system components can be implemented using analog and/or digital circuitry.

///
///
///
///
///
///
///

What is claimed is:

1. A phased array antenna system comprising:

an antenna array including a plurality of antenna elements, each element capable of receiving and/or transmitting an element signal;

bandpass filter circuitry for separating each element signal into multiple signal components of different frequency;

a plurality of phase shifter modules each coupled to a different one of said antenna elements, each of said phase shifter modules including multiple phase shifters for phase shifting the respective multiple signal components of an element signal; and means for combining phase shifted signal components from said plurality of elements to produce a composite antenna input/output signal.

2. The system of claim 1 further including a phase taper controller for defining multiple phase tapers; and wherein said multiple phase shifters are respectively responsive to said multiple phase tapers.

3. A wide bandwidth phased array antenna system comprising:

an antenna array comprised of a plurality of elements each capable of transmitting and/or receiving an element signal, said array being oriented to define a certain boresight direction;

a source/target for sending and/or receiving a signal beam directed at an angle θ relative to said boresight direction;

said beam being comprised of multiple subbeams respectively carried in different frequency channels;

a phase taper controller defining multiple phase tapers, each phase taper relating to a different one of said frequency channels;

phase shift circuitry coupled to said array elements responsive to said defined multiple phase tapers for processing multiple signal components respectively related to said multiple subbeams; and circuitry for combining said multiple signal components to produce a composite antenna input/output signal.

4. The system of claim 3 further including means for band pass filtering each of said element signals to produce multiple signal components respectively related to said multiple subbeams.

5. The system of claim 3 wherein each of said multiple phase taper defines a plurality of phase shift coefficients respectively related to said plurality of array elements; and wherein said phase shift circuitry includes means responsive to each of said phase shift coefficients for phase shifting the element signal associated with the related array element.

6. The system of claim 3 wherein said phase shift circuitry includes a plurality of phase shifter modules each coupled to a different one of said elements;

each of said phase shifter modules including multiple phase shifters respectively related to a different one of said frequency channels;

each of said multiple phase tapers defining a plurlaity of phase shift coeffecients respectively related to said plurality fo array elements; and wherein each of said phase shifters is responsive to a different one of said phase shift coeffieients.

7. The system of claim 6 further including multiple and pass filters; and means for coupling the multiple phase shifters in each of said modules to respective ones of said multiple band pass filters.

8. The system of claim 6 further including a variable gain amplifier coupled to each of said phase shifters.

9. In combination with an antenna array comprising a plurality of antenna elements, a system for increasing the bandwidth of signal energy received by said array, said system including:

source means for directing signal energy to said array distributed amongst multiple frequency channels;

bandpass filter means coupled to said antenna elements for separating received signal energy into multiple signal components respectively related to said multiple frequency channels;

controller means defining multiple phase tapers respectively related to said multiple frequency channels;

multiple phase shifters coupled to said antenna elements for respectivley shifting the phase of each of said signal components in accordance with a different one of said phase tapers; and means for combining said phase shifted signal components to produce a composite antenna signal.

10. The combination of claim 9 wherein each of said multiple phase tapers defines a plurality of phase shift coefficients respectively related to said plurality of phase shift coefficients respectively related to said plurality of antenna elements; and wherein The phase of each of said signal components is shifted in accordance with a different one of said phase shift coefficients to produce coherent component output signals respectively related to said multiple channels; and wherein said means for combining includes means for summing said coherent component output signals to produce said composite antenna signal.

11. The combination of claim 10 including variable gain amplifiers respectively coupled to said phase shifters.

12. A method of operating a phased array antenna system to increase bandwidth comprising the steps of:

providing an antenna array comprised of a plurality of antenna elements;

directing signal energy toward said antenna array comprised of multiple subbeams of different frequency;

defining multiple phase tapers respectively related to said different frequency subbeams where each phase taper defines the phase shift for each antenna element required to produce a coherent component signal;

phase shifting the signals received by said antenna elements in accordance with said defined multiple phase tapers;

band pass filtering signals received by said antenna elements to produce multiple component signals from each element respectively related to said different frequency subbeams; and combining said component signals to produce a composite antenna input/output signal.

* * * * *